Sept. 12, 1961 C. CHEW, SR 2,999,511
CONTROLLING THE FLOW OF MOLTEN GLASS
THROUGH A FURNACE FOREHEARTH
Filed Nov. 9, 1956 7 Sheets-Sheet 1

INVENTOR
CLARENCE CHEW SR.
BY
ATTORNEYS

Sept. 12, 1961 C. CHEW, SR 2,999,511
CONTROLLING THE FLOW OF MOLTEN GLASS
Filed Nov. 9, 1956 THROUGH A FURNACE FOREHEARTH 7 Sheets-Sheet 4

INVENTOR
*CLARENCE CHEW SR.*
BY
ATTORNEYS

Sept. 12, 1961 C. CHEW, SR 2,999,511
CONTROLLING THE FLOW OF MOLTEN GLASS
THROUGH A FURNACE FOREHEARTH
Filed Nov. 9, 1956 7 Sheets-Sheet 5

Fig. 6.

INVENTOR
CLARENCE CHEW SR.
BY Rule & Hoge.
ATTORNEYS

United States Patent Office 2,999,511
Patented Sept. 12, 1961

2,999,511
CONTROLLING THE FLOW OF MOLTEN GLASS THROUGH A FURNACE FOREHEARTH
Clarence Chew, Sr., Godfrey, Ill., assignor to Owens-Illinois Glass Company, a corporation of Ohio
Filed Nov. 9, 1956, Ser. No. 621,356
10 Claims. (Cl. 137—392)

My invention relates to methods and apparatus for controlling the flow of molten glass from a melting and refining tank through a forehearth and automatically regulating the depth of the flowing glass. In the manufacture of a large variety of glassware it is the usual practice to flow the molten glass from the melting and refining tank through a forehearth channel. At the forward end of the channel the glass is withdrawn in the form of gobs or mold charges. The rate at which the glass is withdrawn depends largely on the size of the articles which are being molded and the forehearth must have a capacity for supplying the molten glass at any desired rate. If the mold charges are large the volume of glass drawn during a given time interval is correspondingly large. As the size of the ware is reduced the ratio of the volume of the glass within the forehearth channel to the actual pull or amount of glass drawn during such time interval, increases rapidly. As a result the rate of flow of the glass throughout the length of the forehearth is greatly reduced. This slow flow of the glass while comparatively small ware is being produced, is objectionable for various reasons. In the first place it results in a condition wherein a large or excessive mass of glass is maintained within the forehearth channel. Consequently any required change in temperature of necessity involves a comparatively long time interval. Further this slow flow of the glass at the required elevated temperatures has a tendency to partially deteriorate the surface layer which eventually finds its way into the gobs or mold charges, resulting in defective ware or an excessive amount of offware. Moreover the slow flow of glass through the channel with a comparatively large cross sectional area of the glass results in an uneven rate of flow throughout such area. That is, the stream or current of glass along the middle of the channel moves faster than the comparatively sluggish portions along the bottom and side walls of the channel. This results in a lack of homogeneity of the glass forming the individual mold charges or gobs.

An object of the present invention is to provide a method and means for overcoming the above objectionable conditions. For this purpose there is provided means for automatically maintaining a desired comparatively rapid and even flow of the glass, in the manufacture of small ware, together with means for maintaining a substantially constant temperature of the glass at the point of withdrawal from the forehearth. In keeping with this novel concept provision is made for moving the entire mass of glass uniformly and rapidly throughout approximately the entire length of the forehearth channel and maintaining a uniform temperature at the orifice openings, including means for automatically regulating the depth and rate of flow in the forehearth channel.

In the attainment of this object the invention provides a construction comprising a skimmer or control block suspended over the forehearth and extending downward into the channel at a point adjacent to the forehearth outlet. This control block extends downward within the body of glass a sufficient distance to maintain the desired depth of the glass and control its rate of flow. The volume and rate of flow of the glass is thus regulated and controlled as required in the production of gobs or mold charges. The invention provides means for automatically lifting and lowering the skimmer or control block to maintain the desired depth of glass and flow control needed to prevent stagnation.

The flow of glass in a comparatively shallow stream is conducive to the maintenance of a substantially constant temperature of the mold charges or glass at the point of withdrawal from the forehearth. Such uniform temperature is of vital necessity in the production of uniform and satisfactory ware. The temperature of glass flowing through a forehearth is commonly controlled by burners and blowers arranged along the side walls of the forehearth for projecting flames or a temperature regulating medium over the surface of the flowing glass. If the body of flowing glass is comparatively deep any required change in temperature is correspondingly slow. By flowing a shallow stream the entire mass of glass is comparatively small and quickly responds to the automatic application of heat or a temperature regulating medium. This prevents any wide variations in the temperature of the glass issuing from the forehearth.

A further object of the invention is to provide means for maintaining a constantly uniform temperature at the outlet openings extending through the forehearth floor when glass is being supplied, for example, to plural cavity molds in what is commonly termed double gob operation. In such operation the discharge openings are usually arranged one in advance of another in the forehearth floor and the mold charges are dropped simultaneously for delivery to the plural mold cavities. The present invention is adapted for maintaining substantially uniform and equal temperatures at the outlet openings.

Means for measuring and maintaining the glass level in the forehearth includes a probe extending downward to the glass and which is adapted to be lifted and lowered periodically at short intervals by a motor which automatically reverses periodically. The motor is operatively connected to a recording controller. The controller in turn controls the automatic operation of a motor or cylinder operatively connected for lifting and lowering the skimmer block in response to variations in the glass level as indicated by the recording controller.

Other objects of the invention and the precise nature thereof will appear more fully hereinafter in the detailed description of the apparatus as described in connection with the accompanying drawings which illustrate a preferred form of the invention.

Referring to the drawings:

FIG. 1A is a section at the line 1A—1A on FIG. 1;

Figure 1:
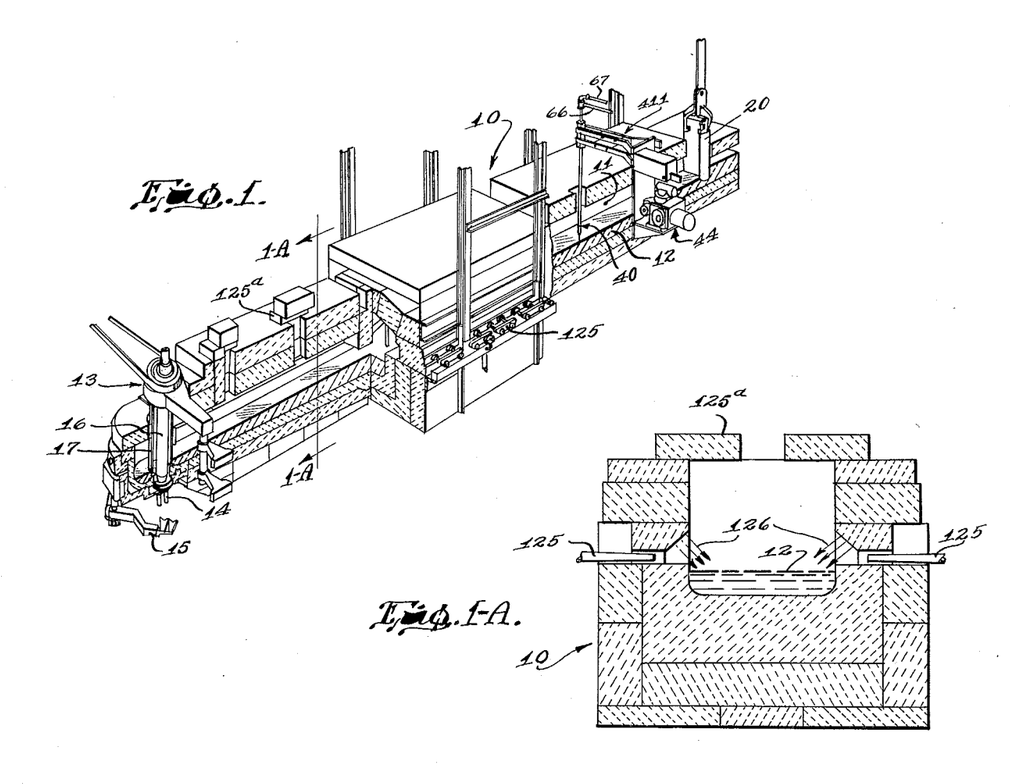
FIG. 1 is a perspective view, partly diagrammatic and with parts broken away, illustrating the forehearth and the means for measuring and controlling the glass level.
Figure 2:
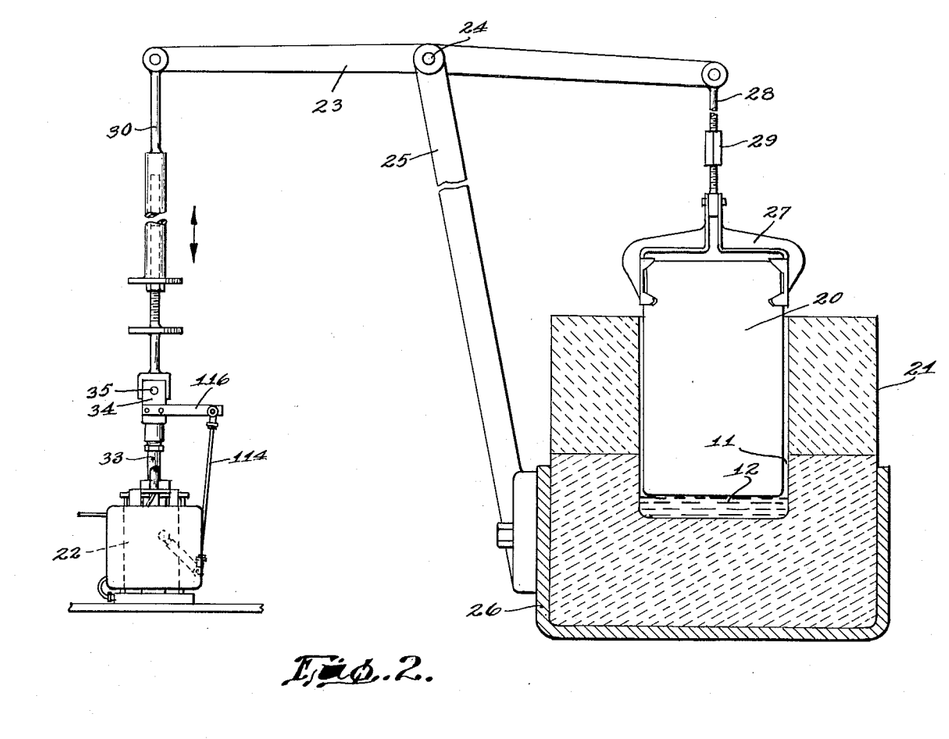
FIG. 2 is an elevational view with the forehearth in cross section, showing the skimmer block and means for lifting and lowering it.
Figure 3:
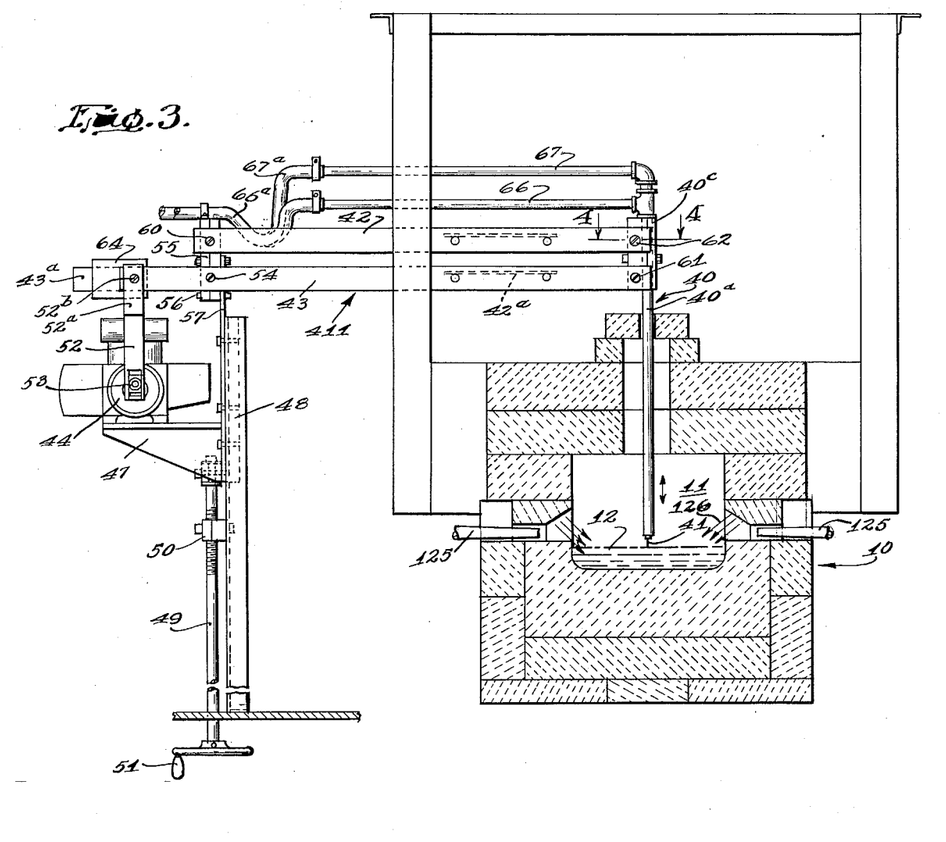
FIG. 3 is a cross sectional view showing the electric probe extending downward into the glass and the motor for reciprocating the probe.
Figure 4:
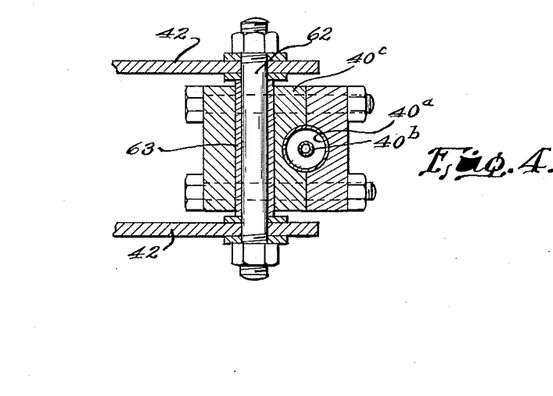
FIG. 4 is a section at the line 4—4 on Fig. 3.
Figure 5:
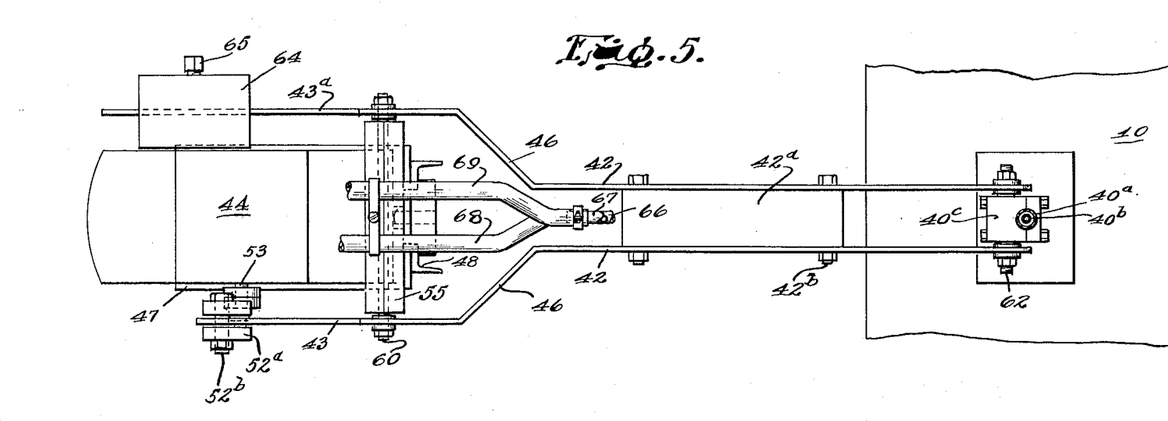
FIG. 5 is a plan view, with parts broken away, of apparatus shown in FIG. 3.
Figure 6:
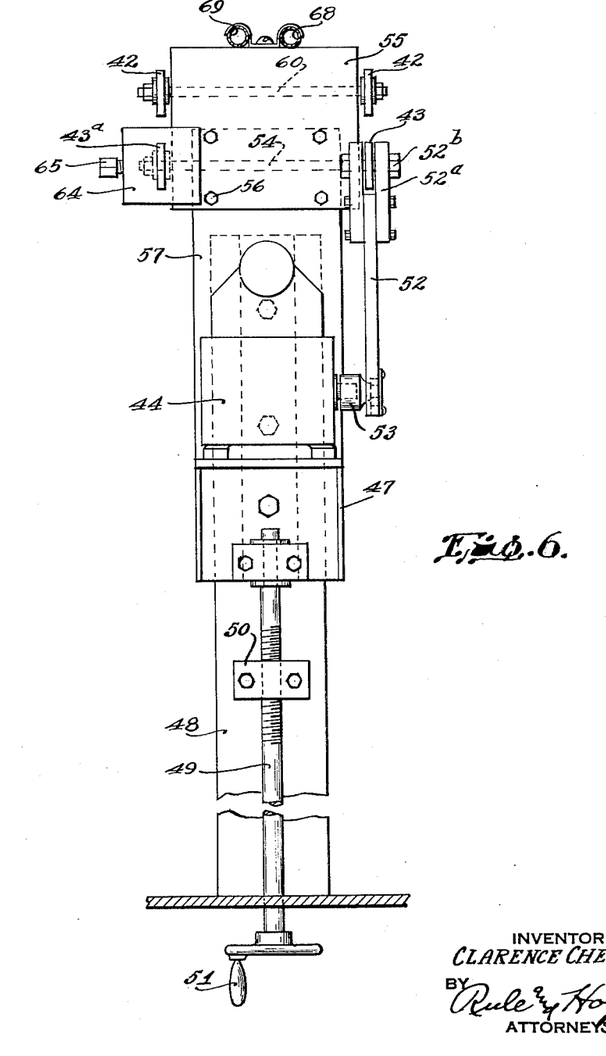
FIG. 6 is an end elevational view of mechanism shown in FIG. 3.

Referring particularly to FIGS. 1, 2, and 3, the apparatus comprises a horizontally disposed forehearth 10 with a channel 11 through which molten glass 12 flows forwardly from a melting and refining tank to the forward end of the forehearth where the glass is withdrawn or discharged. As shown in FIG. 1 the discharge of glass is under the control of a conventional gob feeder 13. The glass flows through outlet openings in the floor of the furnace and forms gobs or mold charges 14 which are periodically severed by shears 15. The rate of flow and form of the mold charges are automatically controlled as by means including a plunger 16 and a rotating sleeve 17.

The depth of the glass in the forehearth and rate of flow through the forehearth are regulated and controlled by a refractory skimmer block 20 which functions as a glass depth control block and which extends downward between side walls 21 into the channel 11. The skimmer block is approximately the full width of the channel so that substantially all the glass flows beneath the skimmer block, thus operating in conjunction with the gob feeding to control the depth of the glass and its rate of flow. This depth of glass on the downstream side of the block is materially less than that of the glass on the upstream side.

Figure 7:
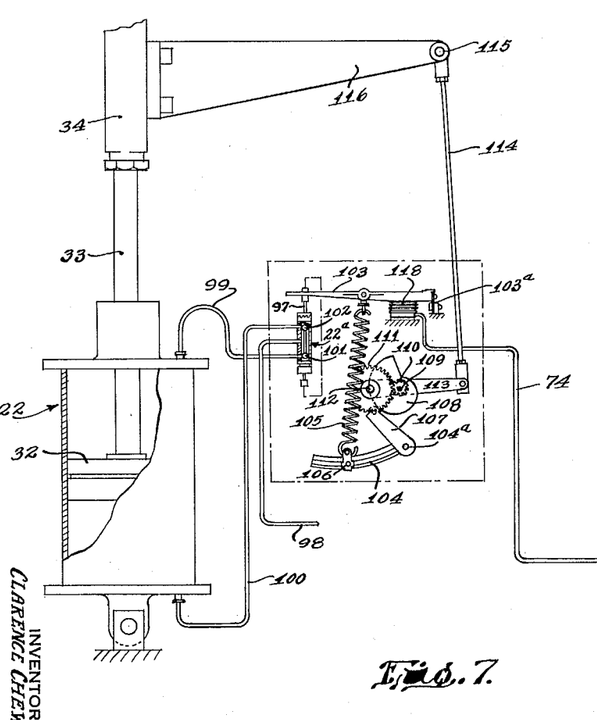
FIG. 7 is a part sectional diagrammatic view showing the motor for lifting and lowering the skimmer block and the means for automatically controlling the operation of the motor.

Means for lifting and lowering the skimmer block includes a piston motor 22 (FIGS. 2 and 7). Means providing operating connections between the motor and skimmer block includes a horizontally disposed lever or walking beam 23 pivotally connected at 24 to a standard 25 which may be fixed to the framework 26 of the forehearth. The skimmer block is carried by a pair of gripping jaws 27 connected through a rod 28 to the lever 23. A turnbuckle 29 permits adjustment of the skimmer block relative to the beam 23. Connecting means between the motor 22 and the beam 23 include a sectional rod 30 comprising screw-threaded telescopically connected sections permitting adjustment of the length of the rod. The motor 22 comprises a piston 32 (FIG. 7) and piston rod 33, the latter being connected through a connector block 34 to the rod 30 by a pivot 35.

Referring to FIGS. 3 to 6, a vertically disposed probe 40 extends downwardly through an opening in the roof of the forehearth and carries at its lower end a platinum electrode 41 which makes electrical contact with the glass 12. The probe comprises an outer tube $40^a$ and an inner tube $40^b$ concentric therewith. The probe is clamped in a split clamping block $40^c$, the sections of which are bolted together. The probe is automatically moved up and down periodically at short intervals by a motor 44 having operating connections with the probe through means including a rocker 411. This rocker comprises an upper pair of bars 42 and a lower pair of bars 43, $43^a$. The bars of each pair are held in parallel spaced relation by spacing plates $42^a$ to which the bars are clamped by bolts $42^b$. The bars 42 and 43 include forwardly divergent sections 46 to provide a comparatively wide spacing between the forward ends of the bars.

The motor 44 is mounted on a bracket 47 carried on a vertical beam 48. The bracket is mounted for up-and-down adjustment on the beam. Means for adjusting the bracket comprises a vertical shaft 49 screw threaded through a bearing block 50 fixed to the beam 48 and rotatably connected to the bracket 47. The rod 49 is rotatable by a hand crank 51 for adjusting the motor 40 up or down. Connections between the motor 44 and the beam 43 include a connecting rod 52 connected at its lower end to an eccentric or crank 53 on the motor shaft. The upper end of the rod 52 is connected by a yoke $52^a$ and pivot pin $52^b$ to the bar 43. The latter forms a lever fulcrumed on a pivot rod 54. The rod 54 is clamped between plates 55 connected by bolts 56 to a plate 57 integral with the bracket 47. The upper bars 42 are pivotally connected to a rod 60 clamped between the plates 55. The blocks 55 and $40^c$ provide parallel link connections between the upper bars 42 and the lower bars 43, $43^a$. The latter are connected by a pivot pin 61 to the link $40^c$. The clamping block $40^c$ carrying the probe 40 is pivotally connected to the bars 42 by a pivot bolt 62 extending through a bearing sleeve 63 (FIG. 4) in the block $40^c$. It will be seen that with the above described construction the rocker 411 swings about the pivot 54 as a fulcrum, moving the probe up and down, the probe being held vertical during such movements by the parallel link connections. The bar $43^a$ has mounted thereon a counterweight 64 adjustable lengthwise of the bar and held in adjusted position by a clamping bolt 65.

Means for circulating water or other cooling fluid through the probe 40 includes pipes 66 and 67 mounted on the rocker 411 and connected respectively with the outer and inner tubes $40^a$ and $40^b$ of the probe. The cooling fluid is supplied through a flexible hose $66^a$ to the pipe 66 and is discharged through a hose $67^a$ attached to pipe 67.

The temperature of the glass within the forehearth channel is regulated, controlled and maintained substantially constant by means of temperature regulating devices 125 (FIGS. 1, 1A and 3). These include burner pipes through which combustible gases are conducted and by which heating flames 126 are directed over the surface of the glass. These pipes positioned along the sides of the forehearth may be distributed throughout the length of the forehearth. A cooling medium may be supplied through selected pipes 125 where needed for reducing the temperature. The burners may operate automatically under thermostat control. Cover blocks $125^a$ extending over openings in the roof of the forehearth (FIGS. 1 and 1A) are adjustable to vary the size of the openings and serve as additional temperature regulating and control devices.

With the construction above described the motor 44, which periodically reverses, oscillates the rocker 411 about its pivot 54 (FIG. 3) and thereby moves the probe up and down periodically. The probe and electrode 41 move downward until the electrode makes contact with the glass. The motor 44 controls the operation of the pen driving motor of the recording instrument, as hereinafter described. The motor 44 is stopped momentarily when the probe 41 makes contact with the glass. During this interval the pen driving motor is rotated to move the pen to a position corresponding to the level of the glass which has been sensed by the probe 41. The rotative position of the pen driving motor and its shaft S when the motor 44 is stopped accordingly depends upon the glass level.

Figure 9:
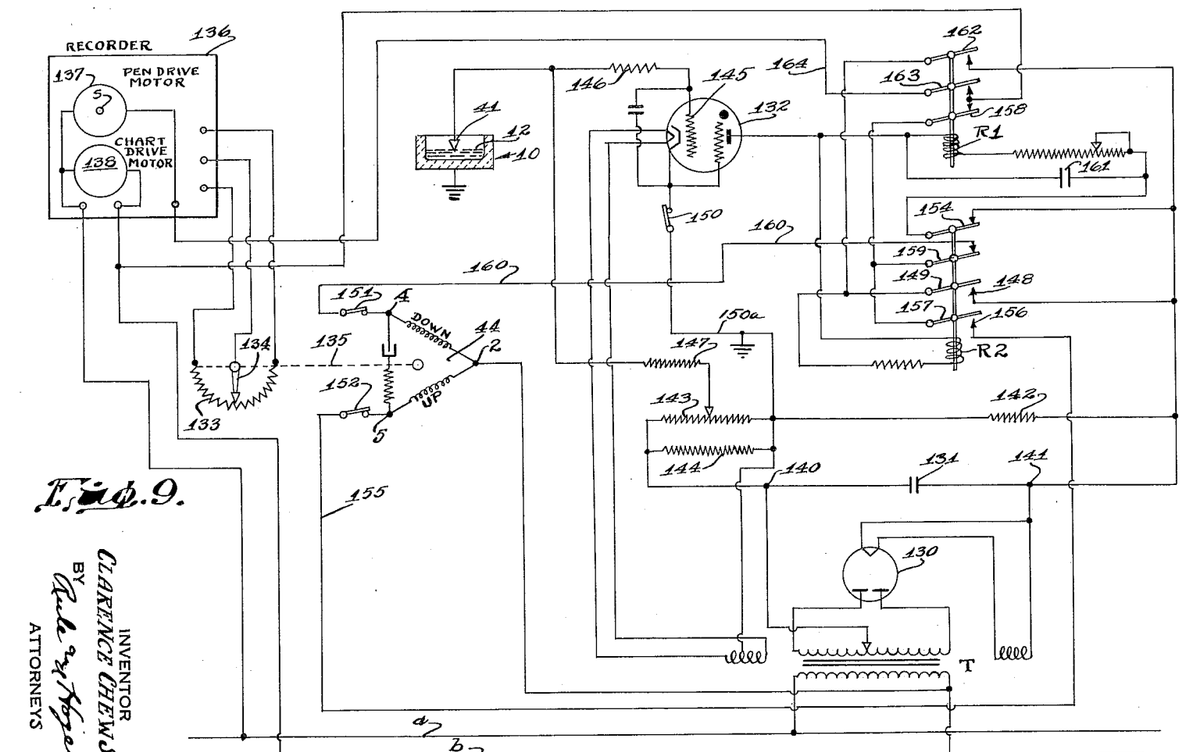
FIG. 9 is a wiring diagram of the electrical system.

The motor 44 is a two winding motor (FIG. 9). When voltage is supplied between the points 2 and 4, the motor drives the probe downward. When the power is applied between the points 2 and 5 the motor drives the probe upward. A down limit switch 151 which is normally closed, is opened by a cam (not shown) when the probe reaches its extreme low position. This is a safety switch and does not enter into the operation when the glass level gauge is working. Its purpose is to deenergize the motor in case the glass level is too low to be reached by the probe or in case of failure of the electronic control unit hereinafter described. An up limit switch 152 is also a normally closed switch which is opened by a cam when the probe reaches its extreme up position. This also is a safety switch and does not enter into the operation when the level gauge is operating. Its purpose is to deenergize the motor in the event that the electronic unit fails to operate when the probe is at the upper end of its stroke. Any of the usual means and methods known in the art for operating limit switches may be used for operating the limit switches 151 and 152. Thus each limit switch may have a stationary mounting in the path of its operating cam, the latter being connected to the moving probe or other part moved with the probe.

Referring to the wiring diagram, FIG. 9, the motor 44 receives its power from an alternating current system comprising mains *a*, *b*. This may, for example, be a 120 volt, 60 cycle system. Voltage is supplied through a transformer T having its primary connected across the mains *a* and *b*. The transformer T together with a full wave rectifier tube 130 and condenser 131, constitutes a conventional full wave filtered power supply furnishing the direct current voltage for operating the rest of the electronic control unit. This unit includes relays R–1 and R–2 and a thyratron 132.

A high-low potentiometer 133 includes a contact arm 134 which has a mechanical driving connection 135 with the motor 44 or the probe operated by said motor. This connection is such that the contact arm 134 is oscillated about its pivot with the oscillating movement of the motor 44 and reaches its limits as the motor reaches its limits during the up-and-down movements of the probe. Thus the motion of the arm 134 has a linear relationship to the motion of the probe.

A recorder 136, which is operated under the control of the motor 44 and potentiometer 133, indicates and records the level of the glass in the forehearth. This recorder may be a null-balancing type of instrument including a reversible pen driving motor 137 and a chart driving motor 138. The motor 138 operates continuously through clock work to rotate the chart on which the record is made by the recording pen driven by the reversible motor 137. The recorder 136 may be an instrument of known construction, herein shown diagrammatically.

When the probe electrode 41 is out of contact with the molten glass 12 there is no electric connection between the probe and ground. When the probe is touching the glass there is a very low resistance, on the order of tens of ohms, between the probe and ground through the molten glass 12 and grounded forehearth 10. The voltage across a portion of the secondary of the transformer T, namely, between points 140 and 141, is divided between a resistor 142 and the parallel combination of resistors 143 and 144. The voltage across the resistor 142 is available to operate the relays R–1 and R–2 through the thyratron 132 when the latter is allowed to conduct. The voltage across the resistor 143 is available as a negative bias to prevent conduction of the thyratron, the control grid 145 of the thyratron being connected through the resistors 146 and 147 to the resistor 143.

The operation of the control system may be described as follows: Beginning at the time the probe electrode 41 has just broken contact with the glass during its upward movement by the motor 44 the electrical action is as follows: The electrode 41 is now isolated from the ground. The voltage across resistor 143 is supplying a negative bias to the thyratron through the resistors 147 and 146. The relay R–2 is energized, having its circuit closed through its contact 148 and contact bar 149, the circuit extending through the thyratron 132 and through an up limit switch 150. This limit switch is opened on the upward stroke on the probe slightly before the latter reaches its extreme limit at which the limit switch 152 would be opened. The relay R–1 is deenergized at this time because its circuit is open at the contact bar 154 of the relay R–2. The motor 44 is driving the probe upward because voltage is being applied between the points 5 and 2 of the motor. This voltage is supplied through a circuit including lead 155, contacts 156, 157 of relay R–2 and closed contact bar 158 of relay R–1.

As the probe approaches the upper limit of its stroke the limit switch 150 is automatically opened as by means of a switch operating lug on the probe or other element moving with the probe. This breaks the circuit for the relay R–2 so that the line supplying voltage to the motor 44 at the point 5 is opened at the contacts 156, 157. At the same time the contact bar 159 of relay R–2 completes a circuit through the lead 160 to the point 4 of the motor. The motor is thus reversed and drives the probe downward. This causes the limit switch 150 to reclose, but the negative bias on the control grid 145 of the thyratron 132 keeps the thyratron from conducting so that neither of the relays R–1, R–2 is energized.

When the probe during its downward movement contacts the hot glass the negative bias applied to the thyratron is reduced greatly because a by-pass across the resistor 147 is formed through the grounded lead 150ª and grounded tank and probe, so that the resistance between the probe and ground is now much lower than that of the resistor 147. The thyratron now conducts and energizes the relay R–1 and charges the condenser 161. When the relay R–1 operates, its contact bar 162 completes a circuit for the relay R–2 which then operates so that the contact bar 154 of R–2 opens the circuit of the relay R–1. However the charge on the condenser 161 keeps relay R–1 closed for a brief time, approximately one second. When this charge is dissipated, the relay R–1 is deenergized. The relay R–2 remains energized through its own holding contacts 149, 148.

During the short time that the circuit for relay R–1 remains closed the motor 44 is stopped because the circuit is opened at the contact bar 158 of the relay R–1, and the pen drive motor 137 in the recorder is energized, its circuit being established through a contact bar 163, the circuit being completed through a lead 164. Accordingly during this time the recorder pen moves to a position corresponding to the position of the contact arm 134 of the potentiometer. Thus the pen drive motor 137 and its shaft S are rotated to a position corresponding to the level of the glass at the probe tip 41. When the relay R–1 opens, the cycle begins to repeat.

Referring to FIG. 7, the automatic means by which the position and rotative movements of the pen drive motor shaft S control the operation of the piston motor 22, includes an air line control mechanism of known construction. Such control mechanism includes bellows 68 and 69 filled with an operating liquid and smaller air bellows 70 and 71 within the larger bellows 68 and 69. A rod 73 connects the inner bellows 70, 71. A counterbalance spring 72 bears against the bellows 69. The control mechanism also includes a pilot valve 88. Air pressure supplied through said control mechanism is transmitted through a pipe 74 to means for controlling the operation of a motor control valve 22ª for the piston motor 22.

A rock arm 75 on the shaft S is connected through a link 76 to a lever 77 fulcrumed at 78. A link 79 connects the lever 77 to a flapper-actuating lever 81 connected to a flapper 82. The flapper bears against a nozzle 83 which communicates through a pipe 84 with the pilot valve 88. The pilot valve includes a smaller bellows 87 within a larger bellows 85. Controlled air pressure is supplied to the pilot valve through a pressure pipe 86 which extends to a nozzle 90. A pilot relay flapper 89 covers the nozzle 90 and the exhaust port through the nozzle 91 of the bellows 87.

Any rotative movement of the shaft S is transmitted through the rock arm 75, link 76, lever 77, and link 79 to rock the flopper actuating lever 81 which bears against the nozzle 83. This results in a change in the back pressure transmitted through the pipe 84 to the larger bellows of the pilot valve. This is opposed to the pressure supplied through the air pressure pipe 86 to the inner bellows. When the forces on the bellows 85 and 87 are balanced the flapper 89 covers both the supply port or nozzle 90 and the exhaust port 91. With an increase in the back pressure from the nozzle 83 the larger pilot bellows 85 moves forward, carrying the exhaust nozzle 91 which pushes against the pilot relay flapper 89 thereby keeping the exhaust port 91 closed and opening the supply port at nozzle 90. With a decrease in the back pressure from the nozzle 83 the larger pilot bellows 85 is retracted and thereby opens the exhaust port 91 and also permits the flapper 89 to close the supply port at nozzle 90.

Any change or pressure in the pilot relay 88 is transmitted through a pipe 92 to the larger bellows in the control unit. This change of air pressure is transmitted through the liquid in the bellows to the inner bellows connected by the horizontal rod 73. This movement of the connecting rod is transmitted through an adjustable lever system, comprising levers 93, 94, to the flapper 82. The flapper is thereby moved in a direction opposite to the movement originally produced, as above described, by the rotation of the flapper-actuating lever 81.

The movement of the flapper 82 resulting from the movement of the connecting rod 73 is just enough to stabilize the air pressure at a new value. This change in the air pressure is proportional to the extent of the rotative movement of the shaft S by which such change has been produced.

Figure 8:
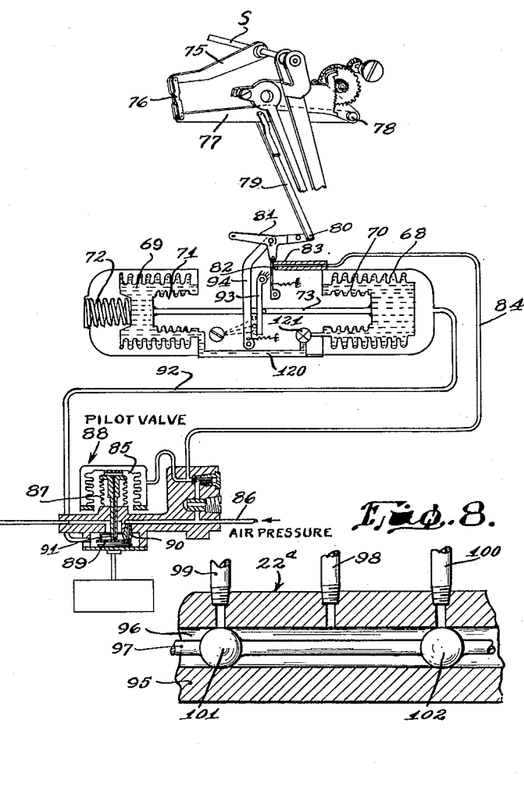
FIG. 8 is a fragmentary detailed view of a valve shown in FIG. 7.

The valve 22ᵃ controlling the operation of the motor 22 comprises a valve casing 95 (see FIG. 8) with a central bore 96. Extending lengthwise through said bore is a valve rod 97. Air pressure for operating the motor is supplied through a pressure pipe 98 and is transmitted through pipes 99 and 100 to the upper and lower ends respectively of the motor cylinder. When the valve rod 97 is in central or neutral position, valve balls 101 and 102 cover ports opening to the pipes 99 and 100 respectively so that the motor piston is held at rest. If the valve rod 97 is moved upwardly the pipe 100 is opened to the pressure pipe 98 and the pipe 99 at the same time is opened to exhaust through the channel 96 so that the motor piston 32 is moved upwardly and operates to lower the skimmer block 20. When the valve rod 97 is moved downward from its neutral position, the pressure line is connected through the valve to the pipe 99 for lowering the motor piston 32 and raising the skimmer block.

The means for automatically operating the valve 22ᵃ is under the control of the air pressure supply through the pipe 74. The valve rod 97 is connected to the free end of a lever 103 mounted to swing about a fulcrum point 103ᵃ. A coil tension spring 105 connects the lever 103 with a rock arm 104 attached to a rock shaft 104ᵃ. Connecting means 106 for the spring 105 permits adjustment of the connecting point lengthwise of the rock arm 104. A rock arm 107 fixed to the rock shaft 104ᵃ carries a cam follower roll running on a cam 108. The cam is keyed to a rock shaft 109 to which is also fixed a gear pinion 110 running in mesh with a gear 111 fixed to a rock shaft 112. A rock arm 113 fixed to the shaft 112 is connected to a rod 114 extending upwardly therefrom. The rod 114 is connected by a pivot 115 to an arm 116 bolted to the block 34 (FIGS. 2 and 7).

The air pressure supplied through the pipe 74 is applied to a bellows 118 which applies upward pressure to the lever 103 opposing the downward pull of the tension spring 105. The lever 103 and therefore the position of the pilot valve rod 97 is stabilized when the opposing forces of the bellows and the spring are balanced. An increase in the pressure supplied through pipe 74 operates through the bellows and the lever 103 to move the valve stem upward, thereby opening the pipe 100 to pressure and causing an upward movement of the motor piston 32. This upward movement of the motor piston operates through the arm 116, link 114, and gear train 111, 110 to rotate the cam 108 in a clockwise direction. This permits the arm 104 to swing upwardly, thereby decreasing the tension on the spring 105. Counterbalancing the increased pressure in the bellows 118 thus requires an upward movement of the lever 103 and valve stem 97.

Automatic resetting of the rock shaft S after the latter has operated as above described is effected as follows: The liquid fills in the larger bellows 68 and 69 are connected through a channel 120 in which is a dial 121 which automatically restricts the passage 120. The smaller bellows 70, 71 are spring loaded by the spring 72 so that they will return to the normal position when the liquid pressures in the two larger bellows have been equalized by the flow of liquid through the channel 120. The rate of this flow depends upon the size of the restriction which is adjusted by the dial 121. As these pressures are equalized and the connector rod 73 moves toward its normal position, the position of the flapper 82 is again changed with respect to the nozzle 83. This change causes a further change in the controlled air pressure in the same direction as the initial change heretofore described. This second corrective action therefore tends to return the rock shaft and is maintained only as long as there is a deviation of the rock shaft S from its normal position. Through the second corrective action the controlled air pressure has been changed to a new value.

Modifications may be resorted to within the spirit and scope of my invention as defined in the appended claims.

I claim:

1. The combination of means providing a horizontally disposed channel through which a fluid flows from a higher to a lower level, a depth regulating block mounted over the channel and extending downward in the channel into the path of the flowing fluid, said block being approximately the width of the channel and controlling the depth of the fluid on the downstream side of the block, a piston motor comprising a cylinder, piston and piston rod, means providing operating connections between the piston rod and said block through which reciprocating movements of the piston rod impart substantially proportional vertical reciprocating movements to the said block, and means controlled by the depth of the fluid in the channel at a point downstream from said block for controlling the operation of the piston motor and causing the motor to move said block into positions to maintain the fluid flowing within the channel substantially at a predetermined level.

2. The combination of means providing a channel through which a fluid is caused to flow, a depth regulating device mounted over the channel and extending downward into the path of the fluid flowing in the channel, a fluid operated motor, means connecting said motor and said depth regulating device, said motor comprising a cylinder and piston, a motor control valve comprising a reciprocating valve stem, means for supplying fluid under pressure through said valve to opposite ends of the motor cylinder, valve operating means for operating the valve stem, and automatic means controlled by the depth of the fluid flowing through the channel for actuating the valve operating means and thereby effecting operation of the motor and bringing the motor piston to rest at a position corresponding to the depth of the fluid in the channel.

3. The combination of a channel for a fluid, a depth regulating device positioned over the fluid in the channel, a motor comprising a reciprocable element, means providing driving connections between said element and the depth regulating device by which the latter is moved up and down by reciprocation of said element, a probe, a reversible electric motor, means providing operating connections between said electric motor and probe for moving the probe up while the motor is operating in one direction and moving the probe down while the motor is operating in the reverse direction, said probe being positioned to be brought into and out of contact with the said fluid by said down and up movements, automatic means for stopping and reversing the electric motor when the probe reaches the limit of its up movement, automatic means for stopping the electrical motor during the downward movement of the probe when the latter makes contact with the said fluid, and means controlled by the position of the probe in its downward movement upon contacting the fluid for effecting operation of the first-mentioned motor and moving the depth regulating device into positions corresponding to the depth of the said fluid.

4. The combination of means providing a channel through which a fluid is caused to flow, a depth regulating device mounted to extend downwardly into the path of the fluid in said channel, a power means, a reciprocable lever, means connecting the power means and the lever for reciprocating the latter, means providing operating connections between said lever and said depth regulating device by which reciprocation of said lever causes up and down movement of said depth regulating device, a probe mounted and positioned over the fluid in said channel, a reversible electric motor, means providing operating connections between the electric motor and said probe for moving the latter downwardly into contact with the said fluid and upwardly out of contact with and away from the fluid, electro-responsive means comprising a circuit including the probe and said fluid for automatically stopping the electric motor when the probe in its downward movement contacts the fluid, reversing the motor and thereby moving the probe upwardly and again reversing the motor when the probe reaches the limit of its said upward movement, and means controlled by the electric motor for effecting operation of said power means.

5. The combination of means providing a channel through which a fluid is caused to flow, a depth regulating device mounted over the channel and extending downward into the path of the fluid flowing through the channel, a fluid operated motor comprising a reciprocating element, means providing operating connections between said element and said depth regulating device for moving the latter up and down when said element is reciprocated, an electric motor, a probe mounted over the fluid in the channel, means providing operating connections between the said electric motor and probe by which the probe is moved up by the operation of the motor in one direction and down by the operation of the motor in the reverse direction, said probe comprising an electrode movable out of and into the flowing fluid by said up and down movement of the probe, means providing an electric control circuit extending through said electrode and the said fluid, means in said circuit controlling the operation of the electric motor and operative to stop and reverse the motor when the probe reaches the limit of its upward movement and to stop the motor when the probe as it moves downward contacts the said fluid, and means controlled by the electric motor for effecting operation of the said reciprocating element.

6. The combination of means providing a channel through which a stream of fluid is caused to flow, a depth regulating block positioned over the channel and adjacent the upstream end thereof and projecting downward into the fluid in the channel, means at the opposite end of the channel for withdrawing fluid therefrom, and automatic means for moving the said block up and down in response to variations in the rate at which the fluid is withdrawn from the channel, said up-and-down movements being in a degree to maintain a substantially constant depth of the fluid within the channel, said automatic means comprising a reversible motor operatively connected to said block for moving it up and down, motor control means operable for alternatively actuating said motor in opposite directions and arresting the operation thereof, a recording control operatively connected to operate said motor control means, said control including probe means for measuring the depth of said fluid in the channel downstream of said depth regulating block therein, said motor control means being operated by the recording controller responsive to variations in the depth measurements of the fluid in the channel as measured by its said probe means.

7. The combination set forth in claim 6, wherein the means for controlling the operation of the motor comprises a motor valve operable for actuating the motor in opposite directions for moving the depth regulating block, a probe positioned over the fluid in the channel, an electrode carried by said probe in position to contact said fluid, an electric motor, means providing an operating connection between the probe and the motor by which the electrode is moved up and down by the motor and by which the electrode is moved periodically into and out of contact with the fluid, an electric control system for the electric motor comprising a control circuit including said electrode and fluid for controlling the operation of the electric motor, said control system being operable for stopping the motor after the electrode contacts the fluid, and automatic means operated upon stopping the electric motor for effecting setting said motor valve, whereby to position the depth regulating block for maintaining said level of fluid in the channel.

8. A combination of means for providing a channel through which a fluid is caused to flow, a depth regulating device located over the channel and extending down into the path of the fluid flowing in the channel, a fluid operated motor comprising a cylinder and piston, means connecting the motor and depth regulating device for raising and lowering the latter, a motor control valve comprising a reciprocating valve stem, means for supplying fluid under pressure through said valve to opposite ends of the motor cylinder, valve operating means for operating the valve stem, means providing an operating connection between the motor piston and said valve operating means for causing movement of the valve stem in one direction in response to movement of the motor piston, and pneumatic means operatively connected to said valve stem operating means and controlled by the depth of the fluid in the channel for causing movement of the valve stem in the reverse direction to effect operation of the motor piston and bring the motor piston to rest at a position corresponding to the depth of the fluid in the channel.

9. The combination set forth in claim 2, wherein the automatic means for actuating the valve operating means comprises means operable by the movement of the motor piston to apply a force to the valve operating means tending to move the valve stem in one direction, and means for applying opposing force to the valve operating means, the former being controlled by the depth of the fluid in the channel, said opposing force being operable through said valve to bring the motor piston to rest at a position corresponding to the said depth of the fluid in the channel.

10. The combination of means providing a channel through which a fluid is caused to flow, a probe extending downward over the fluid in the channel, said probe including an electrode, an electric motor, means providing operating connections between the electric motor and probe for moving the latter up and down and thereby moving the electrode out of and into contact with the flowing fluid, a depth regulating device mounted over the channel and extending downward into the path of the fluid flowing in said channel, a second motor connected for moving the depth regulating device up and down in the channel, electroresponsive control means controlling the operation of said electric motor and including a control circuit comprising said electrode and the said fluid, said control means being operative to arrest the said electric motor when the probe makes contact with the fluid, thereby stopping the electric motor in a position determined by the fluid level when the electrode makes contact with the fluid, and automatic means brought into operation when the electric motor is stopped for effecting operation of the second motor for moving said depth regulating device and bringing it to a position corresponding to the position at which the electric motor is arrested.

References Cited in the file of this patent

UNITED STATES PATENTS

| | | |
|---|---|---|
| 1,619,729 | Howard | Mar. 1, 1927 |
| 1,878,598 | Peiler | Sept. 20, 1932 |
| 2,032,016 | Hitner | Feb. 25, 1936 |
| 2,073,572 | Peiler | Mar. 9, 1937 |
| 2,380,436 | Holdman | July 31, 1945 |
| 2,445,544 | Trautman | July 20, 1948 |
| 2,565,136 | Kretzmer | Aug. 21, 1951 |
| 2,613,443 | Helmick | Oct. 14, 1952 |
| 2,737,807 | Brichard | Mar. 13, 1956 |

FOREIGN PATENTS

| | | |
|---|---|---|
| 1,029,628 | France | Mar. 11, 1953 |